(12) United States Patent
Wiemann et al.

(10) Patent No.: US 8,619,770 B2
(45) Date of Patent: Dec. 31, 2013

(54) LENGTH INDICATOR OPTIMIZATION

(75) Inventors: Henning Wiemann, Aachen (DE); Michael Meyer, Aachen (DE); Joakim Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 648 days.

(21) Appl. No.: 12/447,396

(22) PCT Filed: Jun. 20, 2007

(86) PCT No.: PCT/EP2007/005412
§ 371 (c)(1),
(2), (4) Date: Apr. 27, 2009

(87) PCT Pub. No.: WO2008/049472
PCT Pub. Date: May 2, 2008

(65) Prior Publication Data
US 2010/0074276 A1 Mar. 25, 2010

(30) Foreign Application Priority Data
Oct. 27, 2006 (SE) .................................. 0602284

(51) Int. Cl.
*H04L 12/28* (2006.01)

(52) U.S. Cl.
USPC .......................................... 370/389; 710/309

(58) Field of Classification Search
USPC ..................... 370/389, 471; 710/309
See application file for complete search history.

(56) References Cited

U.S. PATENT DOCUMENTS

| 5,359,551 | A | * | 10/1994 | Pickett .......................... 708/270 |
| 6,317,430 | B1 | * | 11/2001 | Knisely et al. ................ 370/394 |
| 6,510,156 | B1 | * | 1/2003 | Brock et al. ................ 370/395.1 |
| 2004/0024946 | A1 | * | 2/2004 | Naumann et al. ............. 710/309 |
| 2005/0058078 | A1 | * | 3/2005 | Jung et al. ..................... 370/241 |
| 2006/0087585 | A1 | * | 4/2006 | Seo et al. .................... 348/385.1 |

FOREIGN PATENT DOCUMENTS

| EP | 1104207 A1 | 5/2001 |
| EP | 1180 878 A | 2/2002 |
| WO | WO 2005/006599 A | 1/2005 |

* cited by examiner

*Primary Examiner* — Wei Zhao

(57) ABSTRACT

A method, node device, signal, and instruction set to reduce the size of data packets in a telecommunications network. The invention provides a solution wherein a size of SDU position identifiers in a header of a packet data unit is optimized depending on the actual size of the packet data unit, reducing the amount of data sent in the telecommunication network.

15 Claims, 6 Drawing Sheets

| Short Name | Length [bit] | Long Name | |
|---|---|---|---|
| LF | 5 | Length Field | MAC MUX Header |
| EX | 1 | Extension Flag | |
| ... | | Further LF + EX | |
| RBID | 3 | Radio Bearer ID | Default RLC Header (for RLC PDUs and RLC PDU Segm.) |
| SN | 8 | Sequence Number | |
| RF | 1 | Resegmentation Flag | |
| SF | 1 | Start Flag | RLC PDU Header (Transmitted as part of the payload in case of resegmentation, i.e., only in the first RLC PDU Segment) |
| EF | 1 | End Flag | |
| E | 1 | Extension Bit | |
| LI | 5 | Length Indicator | |
| ... | | Further E + LI | |
| | | Payload | |

*Fig. 6*

| Short Name | | LF | EX | ... | RBID | SN | RF | SF | EF | E | LI | ... | |
|---|---|---|---|---|---|---|---|---|---|---|---|---|---|
| Length [bit] | | 15 | 1 | | 3 | 8 | 1 | 1 | 1 | 1 | 13 | | |
| Long Name | | Length Field | Extension Flag | Further LF + EX | Radio Bearer ID | Sequence Number | Resegmentation Flag | Start Flag | End Flag | Extension Bit | Length Indicator | Further E + LI | Payload |
| | MAC MUX Header | | | | Default RLC Header (for RLC PDUs and RLC PDU Segm.) | | | RLC PDU Header (Transmitted as part of the payload in case of resegmentation, i.e., only in the first RLC PDU Segment) | | | | | |

*Fig.7*

| | Short Name | Length [bit] | Long Name |
|---|---|---|---|
| MAC MUX Header | LF | 15 | Length Field |
| | EX | 1 | Extension Flag |
| Default RLC Header (for RLC PDUs and RLC PDU Segm.) | RBID | 3 | Radio Bearer ID |
| | SN | 8 | Sequence Number |
| | RF | 1 | Resegmentation Flag |
| RLC PDU Header | SF | 1 | Start Flag |
| | EF | 1 | End Flag |
| | E | 1 | Extension Bit |
| | LI | 13 | Length Indicator |
| | E | 1 | Extension Bit |
| | LI | 13 | Length Indicator |
| | E | 1 | Extension Bit |
| | LI | 13 | Length Indicator |
| | E | 1 | Extension Bit |
| Payload | | | |

Fig. 8

LENGTH INDICATOR OPTIMIZATION

TECHNICAL FIELD

The present invention relates to a communication header in data packets transmitted in a telecommunication network and in particular to an optimization of the size of the header.

BACKGROUND OF THE INVENTION

In 3GPP terminology a higher layer protocol delivers a Packet Data Unit (PDU) to a lower layer protocol and expects it to be delivered to its peer entity. In other words, the lower layer provides a transmission service to the higher layer. From the lower layer's perspective the higher layer data unit is therefore the service data unit (SDU). A protocol layer (such as the RLC layer in LTE or WCDMA) may segment SDUs if the entire SDU cannot be transmitted at once. Furthermore, it may concatenate multiple such (segments of) SDUs. Finally, one or more such (segments of) SDUs are encapsulated into one PDU. A header is created that contains information about how to interpret the payload section of the PDU. The PDU is then delivered to the next lower layer which handles it as an SDU.

FIG. 7 shows the header of a typical MAC PDU. It may comprise one or more RLC PDUs (also referred to as MAC SDUs) and each of those may comprise (segments of) one or more RLC SDUs (e.g. PDCP PDUs). Such a MAC PDU is transmitted by the lower layers towards the peer protocol stack. Based on the header information the MAC- and RLC-Receiver can reassemble the original RLC SDU.

Of particular interest for this invention are the Length Fields and Length Indicators in the MAC and RLC header. They provide the receiving peer protocol entity with necessary information to reassemble the contained SDUs.

In the context of this invention the Length Field in the MAC header and the Length Indicator in the RLC header specify the size of a service data unit (SDU) or a segment thereof. Alternatively, the fields could provide information about the position of a SDU, i.e., the distance of the first byte of an SDU from the first (payload) byte of the containing PDU. The former is however more efficient if the largest supported SDU is smaller than the largest supported PDU. Both types of fields allow the receiver to determine the size and thereby position of the first and last byte of any contained SDU or segment thereof. In the remainder of this document we therefore use the term SDU position identifier as a generic term for such fields.

The required size of the SDU position identifiers depends on the expected size and size-granularity of the addressed SDUs and/or the containing PDU. A commonly used granularity is one byte. In order to be able to address any size or position inside PDUs of up to $2^x$ byte the Length Fields and Length Indicators must comprise at least x bit (e.g. $2^{15}=32768$). x may be the size of the largest supported SDU if that is known to be smaller than the largest supported PDU.

In state of the art protocols the size of such length and position identifiers are statically or semi-statically configured based on the maximum expected PDU or SDU size.

FIG. 7 illustrates an example of an RLC/MAC header and gives an estimate of the number of bits required for the header fields in LTE RLC and MAC. It can be seen that the Length Field (LF) as well as the Length Indicator (LI) contribute significantly to the overall size of the header. As long as the payload is large compared to the size of the header this is not a big problem. However, if only a few bytes of payload need to be encapsulated, this is a waste of resources.

If the payload in a PDU is small the relative header overhead is large. If e.g. only a single VoIP packet is included in one RLC PDU which is then encapsulated in one MAC PDU the Length Field (LF) generates a considerable overhead. The reason is that a fixed size Length Field must also support very large transport blocks so that e.g. 15 bit must be used. For small packets of e.g. 30 Byte this accumulates to an overhead of ~6%. As the majority of all SDUs are small packets (e.g. VoIP, TCP-ACKs, and SIP Signaling) this becomes significant.

Another problem occurs if several small SDUs are to be encapsulated in a single RLC PDU. Then, a Length Indicator (LI) is required for all but the last one as shown in FIG. 8. If each of the embedded RLC SDUs is e.g. only 30 byte (240 bit) than the overhead of 13+1 bit equals to almost 6% for all but the last RLC SDU.

FIG. 8 illustrates a RLC/MAC header of an RLC/MAC PDU with 4 RLC SDUs encapsulated in one RLC PDU.

The UMTS RLC protocol as described in for instance 3GPP TS 25.322 already gives the possibility to adapt the size of the Length Indicators to the maximum expected PDU size. However, in UMTS RLC the PDU size is pre-configured (for UM the maximum size is pre-configured and the LI depends on this maximum size).

EP 1104207 discloses a data packet with a variable payload field and where the solution changes a length indicator field to the appropriate length of fixed granularity. In order to accomplish this, a separate field is added in the header to indicate if the length of the payload is not an integral unit of octets and if so the appropriate granularity. This has the disadvantage of requiring an examination at each level of infrastructure network of each packet in order to deduce the size and type of data packet. It requires changes of the standardization implementation of data packets and does still require considerable header size.

Furthermore, only two different LI-sizes are supported in UMTS.

SUMMARY OF THE INVENTION

The object of the present invention is to provide a solution for solving at least some of the above mentioned problems and disadvantages. This is provided in a number of aspects in which a first aspect, a telecommunication node for optimizing a size of a header in a PDU, comprises:

- means for deriving from the actual size of the PDU the required size of the SDU position identifiers;
- means for generating a PDU header with optimized SDU position identifier size;
- means for sending to a receiving node a control signal, on a separate communication channel or in another header element, with information about the size of the PDU;
- means for sending the PDU to the receiving node.

The node arrangement may further comprise:

- means for receiving control signal information from a transmitting node arrangement with information about the size of the PDU;
- means for deriving from said size of the PDU the optimal size of the SDU position identifiers;
- means for receiving optimized PDU from the transmitting node arrangement;
- means for decoding the received optimized PDU based on said derived size of the SDU position identifiers.

The optimal size of the SDU position identifiers depends on the supported sizes of PDUs and/or SDUs. The optimal size of a SDU position identifiers expressing the size and position of an SDU inside a PDU may be calculated as a function of the binary logarithm of the size of the PDU in byte rounded to nearest higher integer. LF_size=ceil($\log_2$(PDU_Size))

If the size of the contained SDUs is known to be smaller than the size of the given PDU the size of the SDU position identifiers can be determined as follows:

LF_size=ceil($\log_2$(min(PDU_Size,MAX_SDU_Size)))

A medium access control function may set the SDU position identifiers size. The SDU position identifier size is set to any integer number.

Depending on the protocol specification the granularity of the SDU position identifier size may be larger than one bit. The optimal size is then rounded up to the next supported size.

The control signal information may be a transport format information transmitted on a common control channel. The common control channel may be an L1 control channel.

Yet another aspect of the present invention, a method is provided for optimizing a header size of payload data packets in a telecommunications network, comprising the steps of:
- deriving from the actual size of the PDU the required size of a service data unit, SDU, position identifiers;
- generating a PDU header with optimized SDU position identifier size;
- sending to a receiving node a control signal, on a separate communication channel or in another header element, with information about the size of the PDU;
- sending the PDU to the receiving node.

Still another aspect of the present invention, a signal for transmitting payload data packets in a telecommunications network is provided, comprising a header with dynamically adjustable SDU position identifier sizes.

Also, an instruction set is provided in a node in a telecommunications network, comprising instruction sets for:
- receiving control signal information from a transmitting node arrangement with information about the size of the PDU;
- deriving from said size of the PDU the optimal size of the SDU position identifiers;
- receiving optimized PDU from the transmitting node arrangement;
- decoding the received optimized PDU based on said derived size of the SDU position identifiers.

The basic concept of the invention is to optimize the size of the SDU position identifiers depending on the size of the overall packet data unit size, e.g. MAC PDU and RLC PDU. This optimization is based on the knowledge of the size of the entire transport block and of the entire RLC PDU respectively. This is done both at the user side and the infrastructure side prior to transmission and both sides are arranged to decode packets according to this scheme. Using a separate signal to indicate change of the LF and/or LI fields, it is possible to incorporate the present invention in a standardized communication protocol without amending the core of it. The present invention has the advantage of being flexible in sizing the header providing smaller data packets and reducing unnecessary communication overhead. Furthermore, the present invention will not interfere with the current standard for this type of communication, allowing for a convenient implementation of the solution in current communication networks of this type.

BRIEF DESCRIPTION OF THE DRAWINGS

In the following the invention will be described in a non-limiting way and in more detail with reference to exemplary embodiments illustrated in the enclosed drawings, in which:

FIG. 6 illustrates schematically a payload data packet according to the present invention;

FIG. 7 illustrates schematically a RLC/MAC Header of a normal RLC/MAC PDU according to known techniques; and FIG. 8 illustrates schematically a RLC/MAC header of a normal RLC/MAC PDU according to known techniques.

DETAILED DESCRIPTION OF PREFERRED EMBODIMENTS

Figure 1:
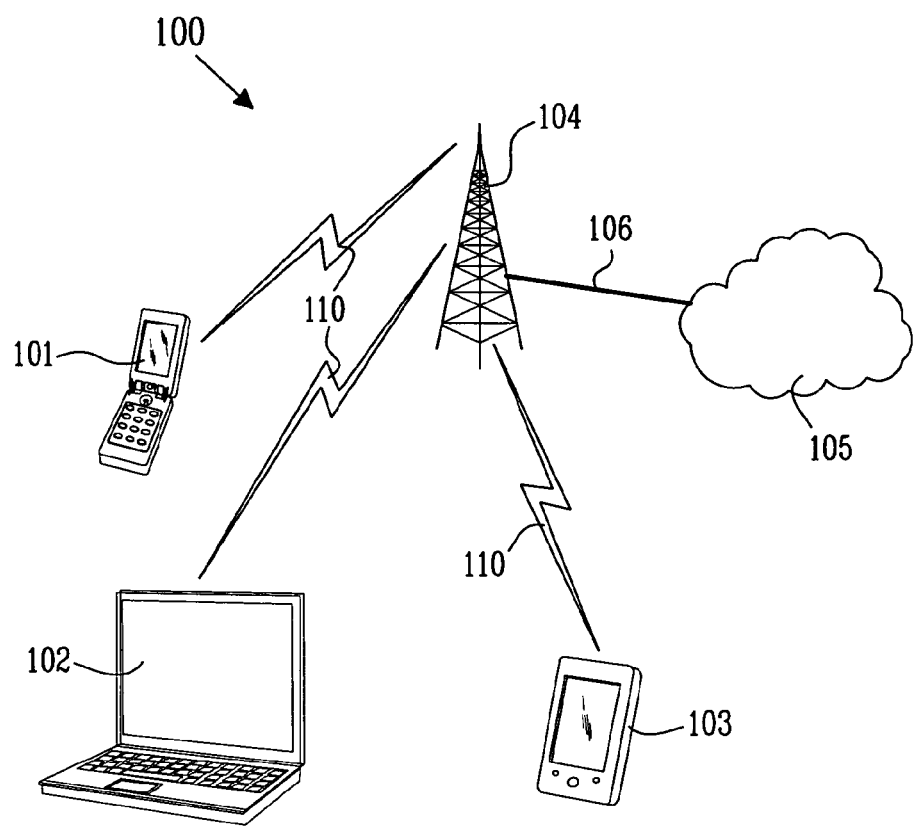
FIG. 1 illustrates schematically a network topology according to the present invention.

In FIG. 1 reference 100 generally denote a network according to the present invention. A user equipment (UE) 101, 102, 103 of some sort, e.g. a mobile phone 101, a laptop 102, or a PDA (personal Digital Assistant) 103, is connected 110 directly or indirectly on a wireless link to a telecommunications gateway (for instance a base station) 104 and communicate with other users (not shown) or services (not shown) available on or through a communication infrastructure network 105. The communication network may for instance include infrastructure network parts of the telecommunication network 100 and the Internet. In FIG. 1 the communication gateway is connected to the communication infrastructure network 105 via a network link 106 of any suitable kind, fixed or wireless. The infrastructure network 105 may comprise a non public network or a public network (e.g. the Internet).

The user equipment and/or the telecommunications gateway may all be denoted as a telecommunication node and in the present invention they are arranged for optimizing a size of a header in a packet data unit, PDU, and the node comprises:
- means for deriving, from the actual size of the PDU, the required size of a service data unit, SDU, position identifiers;
- means for generating a PDU header with optimized SDU position identifier size;
- means for sending to a receiving node a control signal, on a separate communication channel or in another header element (note that the size of a RLC Length Indicator may be derived from the Length Field in a MAC header. Both may be contained in the same transport block and therefore not on separate communication channels), with information about the size of the PDU (this other control information may be a) L1 control information that specifies the size of the entire MAC PDU and b) Length Field that specifies the size of the entire RLC PDU. a) may be used to derive the optimal the LF and b) may be used to derive the optimal size of an LI (Length Indicator));
- means for sending the PDU to the receiving node.

The node may further comprise:
- means for receiving control signal information from a transmitting node arrangement with information about the size of the PDU;
- means for deriving from said size of the PDU the optimal size of the SDU position identifiers;

means for receiving optimized PDU from the transmitting node arrangement;

means for decoding the received optimized PDU based on said derived size of the SDU position identifiers.

The optimal size of the SDU position identifiers depends on the supported sizes of PDUs and/or SDUs. The optimal size of the SDU position identifiers expressing the size and position of an SDU inside a PDU may be calculated as a function of the binary logarithm of the size of the PDU in byte rounded to nearest higher integer.

LF_size=ceil(log$_2$(PDU_Size))

If the size of the contained SDUs is known to be smaller than the size of the given PDU the size of the SDU position identifiers may be determined as follows:

LF_size=ceil(log$_2$(min(PDU_Size,MAX_SDU_Size)))

Depending on the protocol specification the granularity of the SDU position identifier size may be larger than one bit. The optimal size is then rounded up to the next supported size. The supported sizes may be any suitable integer of bits.

A method for optimizing a header size of payload data packets in a telecommunications network, may comprise the steps of:

deriving from the actual size of the PDU the required size of the SDU position identifiers;

generating a PDU header with optimized SDU position identifier size;

sending to a receiving node a control signal, on a separate communication channel or in another header element, with information about the size of the PDU;

The idea of the present invention is that the actually required size of the service data unit (SDU) position identifier, e.g. Length Field (as shown in FIG. 6) is never larger than LF_Size_Opt=ROUNDUP(Log 2(MAC_PDU_Size-byte))

The same applies for the Length Indicator(s) (also shown in FIG. 6) which depends on the size of the RLC PDU:

LI_Size_Opt=ROUNDUP(Log 2(RLC_PDU_Size-byte))

The reason is that LF and LI are actually pointers, pointing to a position (byte) in the PDU. And the index of all these positions is smaller than the overall size of the PDU in byte.

In the method of the present invention the MAC (RLC) transmitter sets the size of the LF-Field (LI-Field) depending on the actual size of the transport block (RLC PDU). This can be done by examining the size of the packet to be transmitted in the software and determining suitable sizes of the Length Fields. The receiver applies the same rule to determine the size of the LF-Field (and/or LI-Field) in the received transport block (RLC PDU). Note that it knows the size of the entire Transport Block from the transport format which is e.g. transmitted on a common control channel (e.g. L1 control channel) and required for decoding anyway. The size of the RLC PDU is then known from the Length Field (LF). The common control channel may be separate (logically and/or physically separate) from the communication channel used for transmitting payload traffic.

As a second embodiment only selected sizes may be allowed for the LF- and LI-Fields. For example, one may want to get byte-aligned header sizes, i.e. in multiples of 8 bit. In combination with the "E" bit, the LI should consequently be either 7 or 15 bit. So, the above-mentioned rule may be extended so that the instantaneous LI-length is either 7 (for RLC PDUs <128 byte) or 15 (for RLC PDUs >128 byte). The method may be performed in both directions: uplink and downlink and in the devices at both sides of the communication link, i.e. in the UE 101 and in a suitable infrastructure device 104 (e.g. a base station or in a RNC depending on the communication technology and network configuration) arranged as a gateway to the communication network 105. Both devices (user side and infrastructure side) are also arranged to decode packets that have been transmitted using the optimized SDU position indicators. The SDU position indicators may be dynamically optimized in a streaming manner.

An example for the Length Field will now be given. If the RLC SDU is e.g. 30 Byte (240 bit) large a fixed size Length Field of e.g. 15 bit gives an overhead of ~6%. As the majority of all SDUs are small packets (e.g. VoIP, TCP-ACKs, or SIP Signalling) this has a significant impact of the overall protocol efficiency.

Actually, a 5 bit Length Field would be sufficient to describe the size of an RLC PDU of up to 255 bit. For the 30 byte RLC SDU mentioned above, this gives a relative overhead of ~2% (5/240) which is a significant improvement compared to the fixed Length Indicator. Note that the receiver can determine the actual size of the Length Field based on the transport format which is transmitted on a common control channel, e.g. the L1 control channel. The transport format comprises the size of the entire transport block (MAC PDU) including padding. A payload data packet with the configuration according to this example is shown in FIG. 6 together with below example of Length Indicator size.

A similar example can be given for the Length Indicator (LI). For example if the MAC Header indicates that the embedded RLC PDU is only 30 byte large but a fixed size LI-Field would still need to be 13 byte to support also large RLC SDUs. The potential gain of connecting the size of the LI-field to the actual size of the RLC PDU is then 8 bits in this example. FIG. 6 illustrates a payload data packet (PDU) using this example in relation to the above mentioned example of Length Field, LF, configuration.

The invention describes a simple way to efficiently reduce the size of the RLC header in LTE (i.e. Long Term Evolution of the 3GPP radio technology for evolution of the 3GPP radio-access technology towards a high-data-rate, low-latency and packet-optimized radio-access technology, for instance by optimizing signalling) but is also applicable to any other communication system where data units are generated and transferred in a similar manner.

Header overhead is an important issue in the LTE protocol design as it has an impact on the protocol performance as well as on the system capacity. The solution improves efficiency and communication rate, in particular for services generating many small data units such as VoIP, TCP-ACKs and Presence-Information. For instance for VoIP services this is of special interest since this type of communication is dependent on low latency (i.e. small delays in communication transferal, the users of a VoIP service will determine the quality of the service at least in part with respect to the delay between talking and when it arrives at the other end of the communication link) and by adjusting the packet size it is possible to reduce transmittal time and reduce the amount of data sent on communication channels leading to an increased performance of the communication.

The above mentioned length optimization solution is implemented in an infrastructure node and/or in a user equipment as instruction sets in software (run in a processing unit, e.g. a microprocessor or a DSP, Digital Signal Processor) or instruction sets in some hardware (e.g. a FPGA, Field programmable Gate Array, or an ASIC, Application Specific Integrated Circuit).

Figure 2:
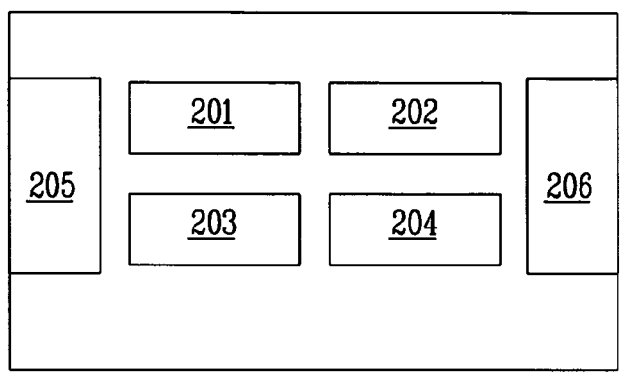
FIG. 2 illustrates schematically a user equipment according to the present invention.

FIG. 2 illustrates in a schematically block diagram user equipment 200 according to the present invention. A processing unit 201 (e.g. a processor) is arranged to run instruction sets for operating the communication part of the equipment. The processor 201 in turn may use at least one memory unit 202, 203 of volatile or non-volatile solution (e.g. RAM or flash memory). A user interface unit 204 may interact with a user of the equipment using any suitable type of user interface equipment (e.g. a keyboard, a keypad and/or other types of buttons or even a voice controlled solution). The user equipment 200 may be arranged with a communication interface 205 for communicating with the communication network 105 via the communication gateway 104 and it may further be arranged with a separate communication interface 206 for communicating with external or internal unit or devices; for instance if the user equipment 200 is part of a laptop the separate communication interface may be connected to internal laptop processing and communication parts for mediating information between the communication network 105 and any application in the laptop 102.

The instruction set(s) may be inserted into the equipment at production time, downloaded using the wireless communication link to the telecommunication network 100, or downloaded using another link to a communication network, such as for instance but not limited to a synchronization link between the mobile phone 101 and a PC (not shown), a TCP/IP link between a laptop and a communication network (e.g. the Internet), and a wireless link (e.g. using at least one of Bluetooth, 802.11, 802.15, or 802.16 series of wireless communication protocols) between a PDA and a PC in turn connected for instance to the Internet.

Figure 3:
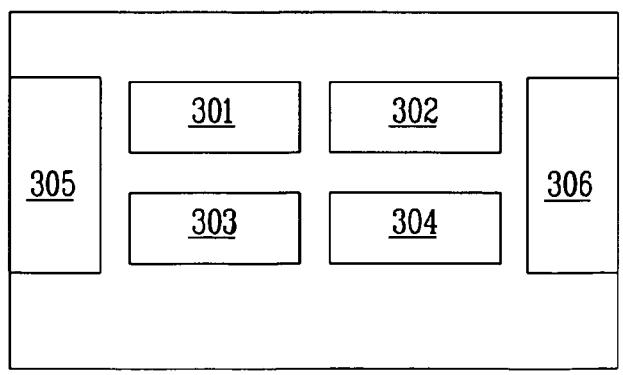
FIG. 3 illustrates schematically an infrastructure device according to the present invention.

FIG. 3 illustrates in a schematic block diagram an infrastructure node (e.g. Base station or RNC) according to the present invention, wherein a processing unit 301 handles communication data and communication control information. The infrastructure node 300 further comprises a volatile (e.g. RAM) 302 and/or non volatile memory (e.g. a hard disk or flash memory) 303, and an interface unit 304. The infrastructure node 300 may further comprise a downstream communication unit 305 and an upstream communication unit 306, each with a respective connecting interface (not shown). All units in the infrastructure node can communicate with each other directly or indirectly through the processing unit 301. Software for handling communication to and from the mobile units attached to the network is at least partly executed in this node and may be stored in the node as well; however, the software may also be dynamically loaded upon start of the node or at a later stage during for instance a service interval. The software can be implemented as a computer program product and distributed and/or stored on a removable computer readable media, e.g. diskette, CD (Compact Disk), DVD (Digital Video Disk), flash or similar removable memory media (e.g. compact flash, SD secure digital, memorystick, miniSD, MMC multimedia card, smart media, transflash, XD), HD-DVD (High Definition DVD), or Bluray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

Figure 4:
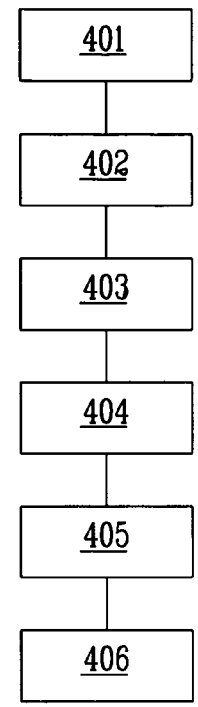
FIG. 4 illustrates schematically a method according to the present invention.

FIG. 4 illustrates in a schematically block diagram a method according to the present invention wherein the transmitter side (infrastructure or user side) of the communication:

401. Examines the data packet (packet data unit) for each packet or data packet type in general for that application to be sent;
402. Calculates an appropriate Length Field size;
403. Calculates an appropriate Length Indicator size;
404. Creates or adjusts the data packet to be sent accordingly;
405. Sends a synchronized control signaling information packet about the data packet or type of data packet (e.g. on a separate control signal channel, physical or logical);
406. Sends the created or adjusted data packet.

Figure 5:
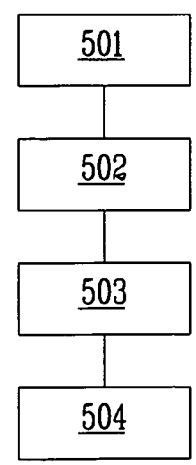
FIG. 5 illustrates schematically another method according to the present invention.

Vice versa, the receiver side of the communication has a process for handling the data packets to decode them into application specific data, this is illustrated in FIG. 5, wherein the receiver:

501. Receives a control signal information packet comprising information about the data packet to be received;
502. Receives the payload data packet;
503. Decodes the payload data packet using the information from the control signal information wherein the Length Field and Length Indicator sizes are given;
504. Transfers the decoded payload information to an application.

The present invention may find applicability in a number of telecommunication applications and it is not restricted to the example given above in a 3GPP network.

It should be noted that the word "comprising" does not exclude the presence of other elements or steps than those listed and the words "a" or "an" preceding an element do not exclude the presence of a plurality of such elements. The invention can at least in part be implemented in either software or hardware. It should further be noted that any reference signs do not limit the scope of the claims, and that several "means", "devices", and "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

DEFINITIONS

LTE Long Term Evolution
RLC Radio Link Control
MAC Medium Access Control
PDU Packet Data Unit
SDU Service Data Unit
VoIP Voice over Internet Protocol
GGSN Gateway GPRS Service Node
GPRS General Packet Radio Service
GTP GPRS Tunnelling Protocol
IP Internet Protocol
PDN Packet Data Network
PDP Packet Data Protocol
PLMN Public Land Mobile Network
RNC Radio Network Controller
SGSN Serving GPRS Service Node
UE User Equipment (=MS)
UMTS Universal Mobile Telecommunications System
LAN Local Area Network
TCP/IP Transmission Control Protocol/Internet Protocol
ACK Acknowledgement
SIP Session Initiation Protocol

The invention claimed is:

1. A receiving node in a wireless communication network, comprising a processor configured to:
    receive control signal information from a transmitting node arrangement with information about a size of a packet data unit (PDU);
    derive from the information about the size of the PDU a size of a Service Data Unit (SDU) position identifier, wherein the SDU position identifier indicates a position of an SDU in the PDU;
    receive the PDU from the transmitting node arrangement; and
    decode the received PDU based on the derived size of the SDU position identifier,
    wherein the processor is configured to receive the control signal information by receiving transport format information transmitted on a common control channel, wherein the common control channel is an L1 control channel.

2. The receiving node of claim 1, wherein the processor is configured to derive the size of the SDU position identifier by determining the size of the SDU position identifier based on a binary logarithm of the size of the PDU.

3. The receiving node of claim 1, wherein the processor is configured to derive the size of the SDU position identifier by determining the size of the SDU position identifier based on a binary logarithm of a first value, wherein the first value comprises a lesser of the size of the PDU and a maximum SDU size.

4. The receiving node of claim 1, wherein the SDU position identifier size comprises one of a set of supported sizes.

5. The receiving node of claim 1, wherein the processor is configured to receive the PDU by receiving a PDU that includes a header having an SDU position identifier with a dynamically adjustable size.

6. A method for receiving data in a wireless communication network, comprising:
    receiving control signal information from a transmitting node arrangement with information about a size of a packet data unit (PDU);
    deriving from the information about the size of the PDU field a size of a Service Data Unit (SDU) position identifier, wherein the SDU position identifier indicates a position of an SDU in the PDU;
    receiving the PDU from the transmitting node arrangement; and
    decoding the received PDU based on the derived size of the SDU position identifier,
    wherein receiving the control signal information comprises receiving transport format information transmitted on a common control channel, wherein the common control channel is an L1 control channel.

7. The method of claim 6, wherein deriving the size of the SDU position identifier comprises determining the size of the SDU position identifier based on a binary logarithm of the size of the PDU.

8. The method of claim 6, wherein deriving the size of the SDU position identifier comprises determining the size of the SDU position identifier based on a binary logarithm of a first value, wherein the first value comprises a lesser of the size of the PDU and a maximum SDU size.

9. The method of claim 6, wherein the SDU position identifier size comprises one of a set of supported sizes.

10. The method of claim 6, wherein receiving the PDU comprises receiving a PDU that includes a header having an SDU position identifier with a dynamically adjustable size.

11. An apparatus for receiving data In a wireless communication network, the apparatus comprising:
    a communication interface configured to communicate with a wireless communication network; and
    a processor configured to:
    receive control signal information from a transmitting node arrangement with information about a size of a packet data unit (PDU);
    derive from the information about the size of the PDU field a size of a Service Data Unit (SDU) position identifier, wherein the SDU position identifier indicates a position of an SDU in the PDU;
    receive the PDU from the transmitting node arrangement; and
    decode the received PDU based on the derived size of the SDU position identifier,
    wherein the processor is configured to receive the control signal information by receiving transport format information transmitted on a common control channel, wherein the common control channel is an L1 control channel.

12. The apparatus of claim 11, wherein the processor is configured to derive the size of the SDU position identifier by determining the size of the SDU position identifier based on a binary logarithm of the size of the PDU.

13. The apparatus of claim 11, wherein the processor is configured to derive the size of the SDU position identifier by determining the size of the SDU position identifier based on a binary logarithm of a first value, wherein the first value comprises a lesser of the size of the PDU and a maximum SDU size.

14. The apparatus of claim 11, wherein the SDU position identifier size comprises one of a set of supported sizes.

15. The apparatus of claim 11, wherein the processor is configured to receive the PDU by receiving a PDU that includes a header having an SDU position identifier with a dynamically adjustable size.

* * * * *